(12) United States Patent
Kumashiro (10) Patent No.: US 12,173,639 B2
(45) Date of Patent: *Dec. 24, 2024

(54) THERMOSTAT DEVICE

(71) Applicant: NIPPON THERMOSTAT CO., LTD., Kiyose (JP)

(72) Inventor: Tsuyoshi Kumashiro, Kiyose (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/266,707

(22) PCT Filed: Sep. 27, 2021

(86) PCT No.: PCT/JP2021/035254
§ 371 (c)(1),
(2) Date: Jun. 12, 2023

(87) PCT Pub. No.: WO2022/137687
PCT Pub. Date: Jun. 30, 2022

(65) Prior Publication Data
US 2024/0052770 A1    Feb. 15, 2024

(30) Foreign Application Priority Data

Dec. 22, 2020   (JP) ................. 2020-211952

(51) Int. Cl.
*F01P 7/16*   (2006.01)
*F01P 7/14*   (2006.01)
*G05D 23/02*  (2006.01)

(52) U.S. Cl.
CPC .............. *F01P 7/16* (2013.01); *G05D 23/02* (2013.01); *F01P 2007/146* (2013.01)

(58) Field of Classification Search
CPC ...... F01P 7/16; F01P 2007/146; G05D 23/02; G05D 23/022; G05D 23/134;
(Continued)

(56) References Cited

U.S. PATENT DOCUMENTS 4,017,878 A    4/1977   Hagiwara
5,975,116 A *  11/1999  Rosas .................... F16K 17/36
                                               285/402

(Continued)

FOREIGN PATENT DOCUMENTS

JP    S54-35076 Y2    10/1979
JP    H07-301262 A    11/1995
(Continued)

OTHER PUBLICATIONS

PCT/ISA/210, "International Search Report for PCT International Application No. PCT/JP2021/035254," Dec. 21, 2021.

*Primary Examiner* — Grant Moubry
*Assistant Examiner* — Ruben Picon-Feliciano
(74) *Attorney, Agent, or Firm* — HAUPTMAN HAM, LLP (57) ABSTRACT

Provided is a thermostat device in which the direction of a radiator-side pipe can be easily changed and which can suppress cost. A housing includes a first housing member having a radiator-side pipe and a second housing member that is rotation-fastened to the first housing member by a bayonet structure. The bayonet structure has a plurality of claw parts that are formed side by side in a circumferential direction on one of the first and second housing members and a plurality of locking parts that are formed on the other of the first housing member and the second housing member and with which the claw parts engage. The radiator-side pipe, when seen from one side of a rotational axis X during (Continued)

the fastening of the first and second housing member, is inclined with respect to the rotational axis X.

5 Claims, 5 Drawing Sheets

(58) Field of Classification Search
CPC ...... F16K 31/002; F16K 27/02; F16K 11/044; F16K 27/0263
See application file for complete search history.

(56) References Cited

U.S. PATENT DOCUMENTS

| | | | |
|---|---|---|---|
| 6,761,321 B2* | 7/2004 | Takahashi | F01P 7/16 236/34.5 |
| 7,617,989 B2* | 11/2009 | Caleffi | G05D 23/1921 236/93 R |
| 2002/0021624 A1 | 2/2002 | Hiranuma et al. | |
| 2002/0104892 A1 | 8/2002 | Suda | |
| 2011/0095091 A1* | 4/2011 | Suda | F16K 31/025 236/34 |
| 2011/0214626 A1* | 9/2011 | Watanabe | F01P 7/167 123/41.1 |
| 2012/0055565 A1* | 3/2012 | Kanzaka | G05D 23/1333 137/468 |
| 2019/0032540 A1* | 1/2019 | Kumashiro | H05B 3/141 |

FOREIGN PATENT DOCUMENTS

| | | |
|---|---|---|
| JP | 2000-120901 A | 4/2000 |
| JP | 2001-317355 A | 11/2001 |
| JP | 2002-062376 A | 2/2002 |
| JP | 2019-062790 A | 4/2019 |
| JP | 2019-204186 A | 11/2019 |

* cited by examiner

THERMOSTAT DEVICE

RELATED APPLICATIONS

The present application is National Phase of International Application No. PCT/JP2021/035254 filed Sep. 27, 2021, and claims priority from Japanese Application No. 2020-211952, filed Dec. 22, 2020, the disclosure of which is hereby incorporated by reference herein in its entirety.

TECHNICAL FIELD

The present invention relates to a thermostat device disposed in the middle of a circulation flow path through which a coolant is circulated between an internal combustion engine (hereinafter referred to as an engine), for example, mounted on automobiles and the radiator, to control the coolant temperature properly.

BACKGROUND

The thermostat device is disposed on the inlet or outlet side of the engine and provided with a thermo-element incorporating a thermal expansion body (wax) contracting and expanding by sensing a temperature change in the coolant flowing through the circulation flow path between the engine and the radiator and functions to control the coolant to a predetermined temperature by opening and closing the control valve (valve body) by volume change caused by contraction and expansion of the thermal expansion body.

A thermo-operating unit, including a thermo-element incorporating a thermal expansion body and a control valve, is contained within the housing. Then, when the coolant temperature is low, the control valve is closed and the coolant is circulated through the bypass passage without passing through the radiator. Also, when the coolant temperature increases, the control valve opens to circulate the coolant through the radiator, which controls the temperature of the coolant through the water jacket, which is the cooling water path in the engine, to a proper state.

Figure 6:
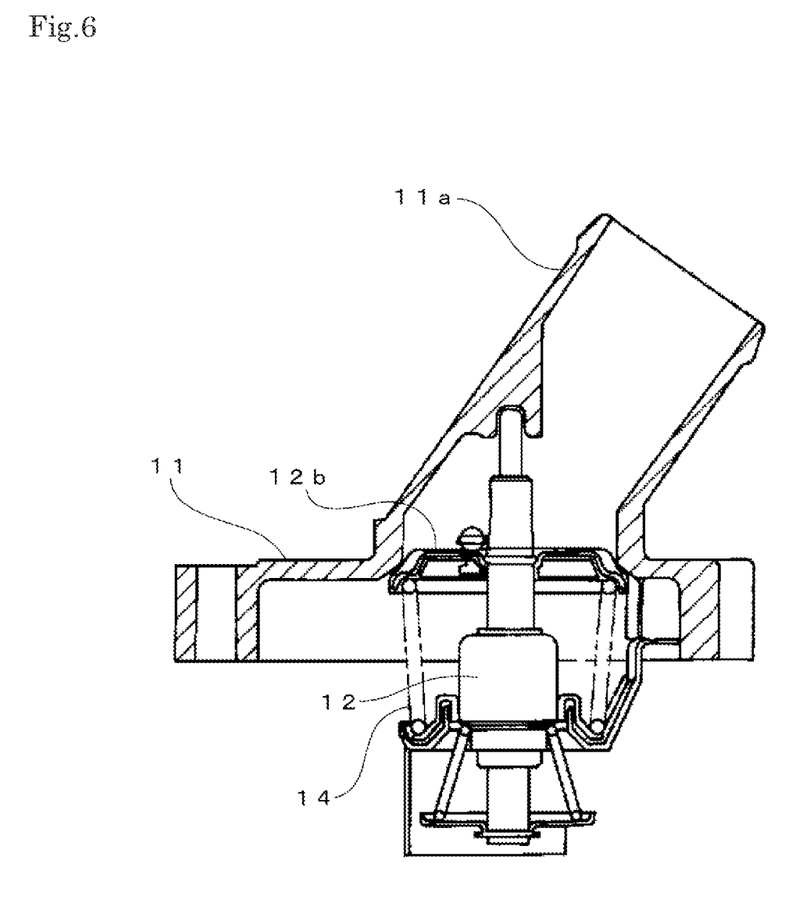
FIG. 6 is a partial cross-sectional view of a conventional thermostat device.

FIG. 6 shows the thermostat device disclosed in Patent Literature 1. As shown in FIG. 6, in some thermostat devices, for the convenience of the arrangement of the circulation flow path, the radiator side pipe 11a leading to the radiator may be formed bent at a predetermined angle with respect to the thermo-element 12.

CITATION LIST

Patent Literature

PTL 1: JP-A-H7-301262

SUMMARY OF INVENTION

Technical Problem

Since the layout of the thermostat arranged in an engine compartment may differ for each vehicle type, the arrangement of hoses and piping forming circulation paths may differ. Accordingly, the optimum direction of orientation of bending of the radiator-side pipe 11a of the thermostat device differs depending on the vehicle type.

As shown in FIG. 6, however, it is difficult to change the optimum bending direction of the radiator-side pipe 11a for a vehicle type in the thermostat device in which the first housing member 11 on which the radiator-side pipe 11a is formed is bolted to the second housing member (not shown), and inside of which the thermo-element 12, the control valve 12b, the spring member 14 are housed.

It is because, to change the orientation of the radiator-side pipe 11a, a mold to form the first housing member 11 is necessary to individually prepare in accordance with the orientation of the radiator-side pipe 11a, whereby the manufacturing cost of the thermostat device increases.

It is an object of the present invention to provide a thermostat device that can easily change the orientation of a radiator-side pipe and suppress costs.

Solution to Problem

The thermostat device according to the present invention to solve the above problem is provided with a housing disposed in the middle of a circulation flow path for circulating coolant between an engine and a radiator, having a housing chamber therein and a first conduit and a second conduit for recirculating the coolant into the housing chamber;
  a valve seat formed on the inner circumferential wall between the chamber of the housing and the first conduit;
  a thermo-element housed in the housing chamber, moving in the axial direction depending on the temperature of the coolant;
  a control valve seating on or unseating from the valve seat in accordance with the axial movement of the thermo-element; and
  a spring member which biases the control valve toward the valve seat.

The housing of the thermostat device also is provided with a first housing member on which the valve seat is formed having a radiator-side pipe with the first conduit formed, and a second housing member which is rotated to fasten to the first housing member with a bayonet structure to form a second conduit. Further, the bayonet structure includes a plurality of claws formed arrayed on the circumferential direction on either one of the first or second housing members and a plurality of locking portions to which the claws are locked on the other. When viewed from one side of the rotation axis, the radiator-side pipe is inclined with respect to the rotation axis at the time of the fastening of the first housing member and second housing member.

The orientation of the radiator-side pipe can be changed by changing the mating locking portion that engages any one of the multiple claws. At the time of changing the orientation of the radiator-side pipe, only changing the combination of claws and the mating locking portion allows changing the orientation, and there is no need to remark the mold of the first housing member as conventional cases, which reduces the manufacturing cost.

In the thermostat device, on the outer surface of the housing, a position indicator is placed on one of the first and second housing members, and positioning marks pointing to the position indicator are put on the other. The position indicator is made to coincide with one of the claw or locking portions, and the positioning mark may indicate which of the plurality of claws engages the corresponding one of the plurality of locking portions. In this way, the orientation of the radiator-side pipe can be easily set only by matching the position indicator to the positioning mark in accordance with the desired orientation of the radiator-side pipe.

The thermostat device may include a pin penetrating the first and second housing members in a state where the first and second housing members are fastened by turning with the bayonet structure. Since relative rotation between the first and second housing members can be prevented with this structure, the unintended release of the fastening of the first and second housing members can be securely inhibited.

The second housing member of the thermostat device may include a spring seat receiving one end of the spring member. With this structure, the claws are pressed to the locking portions by the spring member when the control valve is seated on the valve seat. Accordingly, disassembly due to easy relative rotation of the first and the second housing members can be prevented without providing an anti-rotating structure, such as a pin.

The thermostat device may also include a seal member for sealing between the first and second housing members, wherein the claw is disposed further outward than the seal member. Since the claw is not immersed in the coolant, it is advantageous in durability when the housing is made of synthetic resin.

Advantageous Effects

According to the thermostat device of the present invention, it is possible to easily change the orientation of the radiator-side pipe and curb costs.

DESCRIPTION OF EMBODIMENTS

A thermostat device of an example of embodiments according to the present invention will be described with reference to drawings FIGS. 1 through 5 below. The thermostat device 1 according to the present embodiment is of an inlet control type disposed on an inlet side of a coolant of the engine.

More specifically, the thermostat device 1 is disposed at an intersecting portion of a circulation path which circulates cooled coolant passed through the radiator to the engine and a bypass passage which circulates the coolant warmed by the engine without passing through the radiator to the engine and attached to a water pump to deliver the coolant to the engine. The temperature of the coolant to be delivered to the engine is adequately controlled by mixing the coolant cooled by the radiator and the coolant warmed by the engine passing through the bypass passage.

Figure 1:
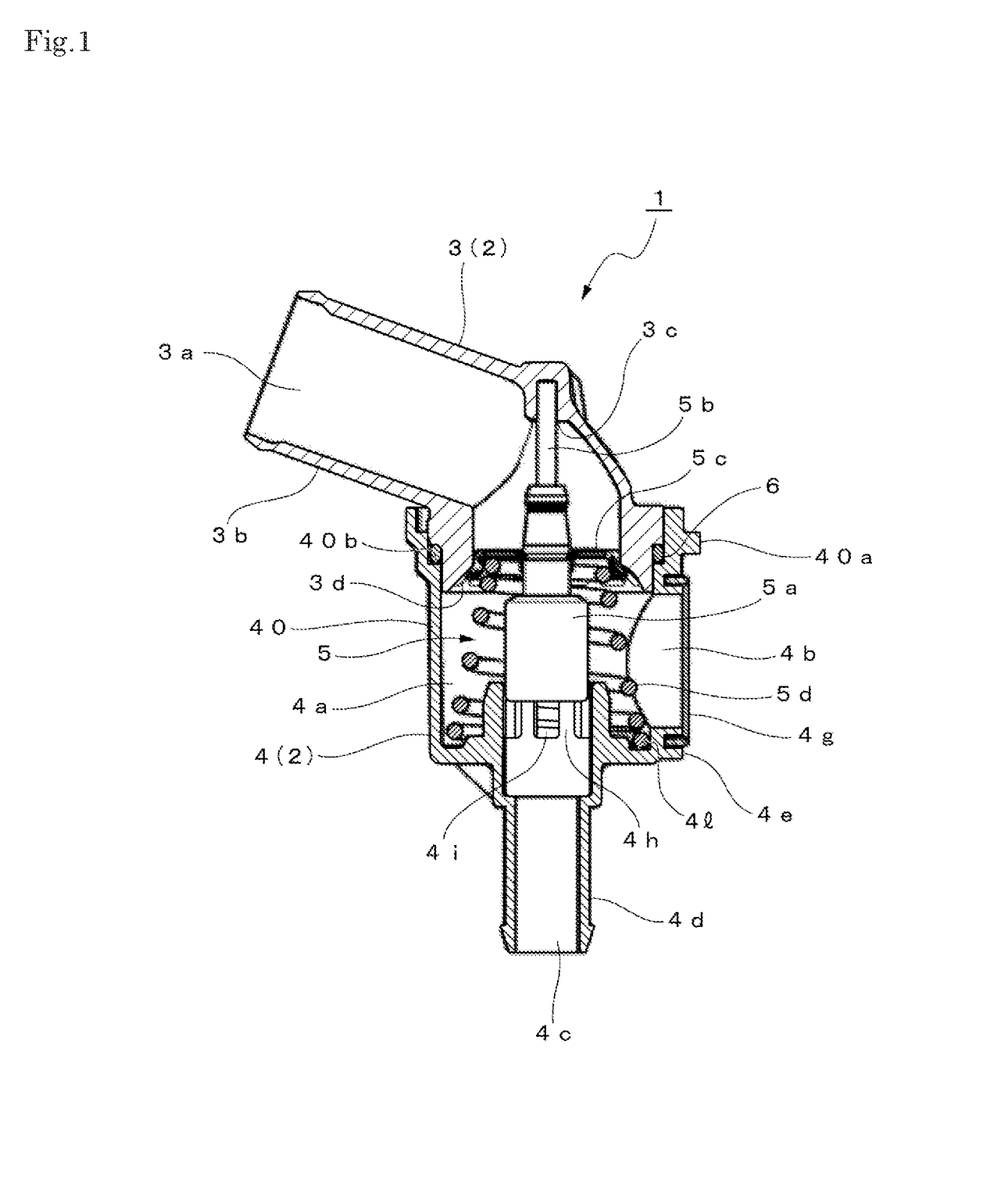
FIG. 1 is a central sectional view of a thermostat device according to one embodiment of the present invention.

For the convenience of explanation below, the upper and lower parts in the drawing are simply expressed as "upper" and "lower," respectively, in the posture of the thermostat device 1 shown in FIG. 1.

In this embodiment, the housing 2 constituting the outer shell of the thermostat device 1 is composed of a first housing member 3 and a second housing member 4, both molded of synthetic resin material.

The first housing member 3 includes a radiator-side pipe 3b connected to a path leading to the radiator. Inside the first housing member, the first conduit 3a is formed, leading the cooled coolant passing through the radiator to the housing chamber 4a, to be described later, in the housing 2.

The second housing member 4 has a body 40 having a bottomed cylindrical shape in which a housing chamber 4a for housing the thermo-element 5a described below is formed, and a bypass passage-side pipe 4d extending downward from the bottom of the body portion 40 and connected to a conduit leading to the bypass passage.

The side portion of the body 40 is provided with a connection portion 4e for connecting the thermostat device 1 to the water pump. One end of the second conduit 4b for supplying the coolant in the housing 2 to the water pump is opened in the connection portion 4e.

Further, a third conduit 4c is formed inside the bypass-passage-side pipe 4d for leading the coolant warmed by the engine into the housing 2 without passing through the radiator.

The connecting portion 4e for connecting the thermostat device 1 to the water pump is provided in a flange shape projecting radially outward from the opening edge of the second conduit 4b, and a plurality of fastening bolt insertion holes 4f (see FIG. 5) are formed in the connecting portion 4e. An annular gasket 4g (see FIG. 1) is attached to the connection portion 4e surrounding the opening of the second conduit 4b.

The housing 2 houses a thermo-operating unit 5. The thermo-operating unit 5 includes a cylindrical thermo-element (temperature sensing portion) 5a incorporating a thermal expansion body (wax) that expands and contracts depending on the temperature of the coolant and a piston 5b disposed along the axis of the thermo-element 5a and advancing and retracting in the thermo-element 5a by expansion and contraction of the thermal expansion body.

The tip located at the upper end of the piston 5b is fitted into a shaft supporting portion 3c formed at the center upper portion in the first housing member 3, and upward movement of the piston 5b relative to the housing 2 is restricted.

With this structure, when the surrounding coolant warms the thermo-element 5a and the internal thermal expansion body expands, the thermo-element 5a moves axially downward to leave the piston 5b out of the thermo-element 5a, and the thermo-operating unit 5 extends.

Conversely, when the thermo-element 5a is cooled by the surrounding coolant and the internal thermal expansion body contracts, the thermo-element 5a moves axially upward to allow the piston 5b to enter the thermo-element 5a and the thermo-operating unit 5 contracts.

Thus, cylindrical thermo-element 5a operates to move in the axial direction in the housing chamber 4a depending on the temperature of the coolant.

The thermostat device 1 is provided with a disk-shaped control valve (valve body) 5c attached to the upper portion of the thermo-element 5a and a spring member 5d biasing the control valve 5c upward.

An annular valve seat 3d is formed on the inner circumference of the housing 2, and the control valve 5c is seated or unseated on the valve seat 3d. The valve seat 3d locates between the first conduit 3a and the housing chamber 4a. When the control valve 5c seats in the valve seat 3d, the communication between the first conduit 3a and the second conduit 4b via the housing chamber 4a is shut, and the flow of the coolant from the radiator to the water pump is inhibited. Conversely, when the control valve 5c unseats from the valve seat 3d, the communication between the first conduit 3a and the second conduit 4b is allowed, and the coolant flows from the radiator to the water pump.

At the bottom portion of the body 40 of the second housing member 4, one end of the third conduit 4c is opened, and guide members 4h stand up to surround the opening. The guide members 4h are cylindrical, and the thermo-element 5a is inserted to be axially movable in the axial direction therein. Lateral holes 4i are formed on the guide member 4h, and the coolant from the bypass passage flows to the water pump through the third conduit 4c, lateral holes 4i, housing chamber 4a, and the second conduit 4b.

Further, a spring seat 4l is formed on the outer periphery of the guide members 4h, and a spring member 5d is interposed between the spring seat 4l and the control valve 5c. In this embodiment, the spring member 5d is a coil spring that surrounds the thermo-element 5a and the guide 4h and is set in a compressed state between the control valve 5c and the spring seat 4l.

Accordingly, the spring member 5d biases the disk-shaped control valve 5c to press against the annular valve seat 3d formed on the first housing member 3.

The guide members 4h hold the lower part of the thermo-element 5a slidably. This construction effectively prevents radial runout of the vicinity of the lower part of the thermo-element 5a and achieves a smooth motion of the thermo-element 5a along the axial direction.

According to the thermostat device 1 configured above, the coolant supplied from the bypass passage side to the third conduit 4c is mainly supplied toward the thermo-element 5a.

Thus, when the temperature of the coolant from the bypass passage side rises, the thermal expansion body built in the thermo-element 5a expands, the piston 5b advances the thermo-element 5a, and the control valve 5c moves downward together with the thermo-element 5a against the biasing force of the spring member 5d to get unseated (open) from the valve seat 3d.

Thus, the coolant from the first conduit 3a via the radiator is introduced into the housing 2, mixed with the coolant introduced from the third conduit 4c, and fed from the second conduit 4b to the engine via the water pump.

Conversely, when the temperature of the coolant from the bypass passage side is lowered, the thermal expansion body incorporated in the thermo-element 5a contracts to let the piston 5b enter into the thermo-element 5a, and the control valve 5c moves upward together with the thermo-element 5a by the biasing force of the spring member 5d to seat on the valve seat 3d (close).

Accordingly, the flow-in of the coolant from the first conduit 3a to the housing 2 is blocked, and the coolant from the bypass side passage introduced from the third conduit 4c is fed to the engine from the second conduit 4b via the water pump.

Thus, the temperature of the coolant passing through the water jacket of the engine can be controlled to an appropriate temperature by opening and closing the control valve 5c by the operation of the thermo-operating unit 5 according to the temperature of the coolant.

Figure 2:
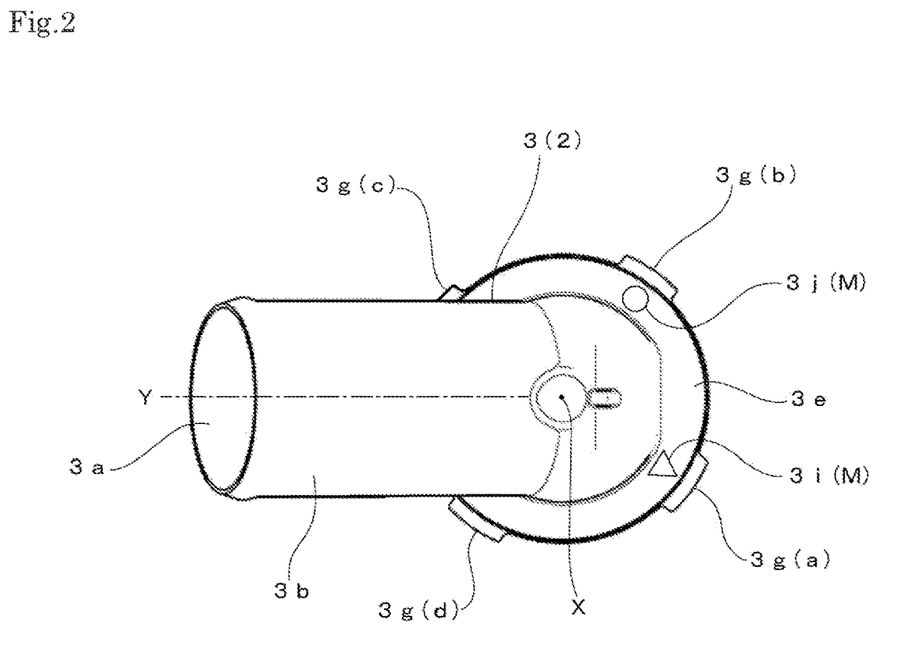
FIG. 2 is a plan view of a first housing member of the thermostat device shown in FIG. 1.
Figure 3:
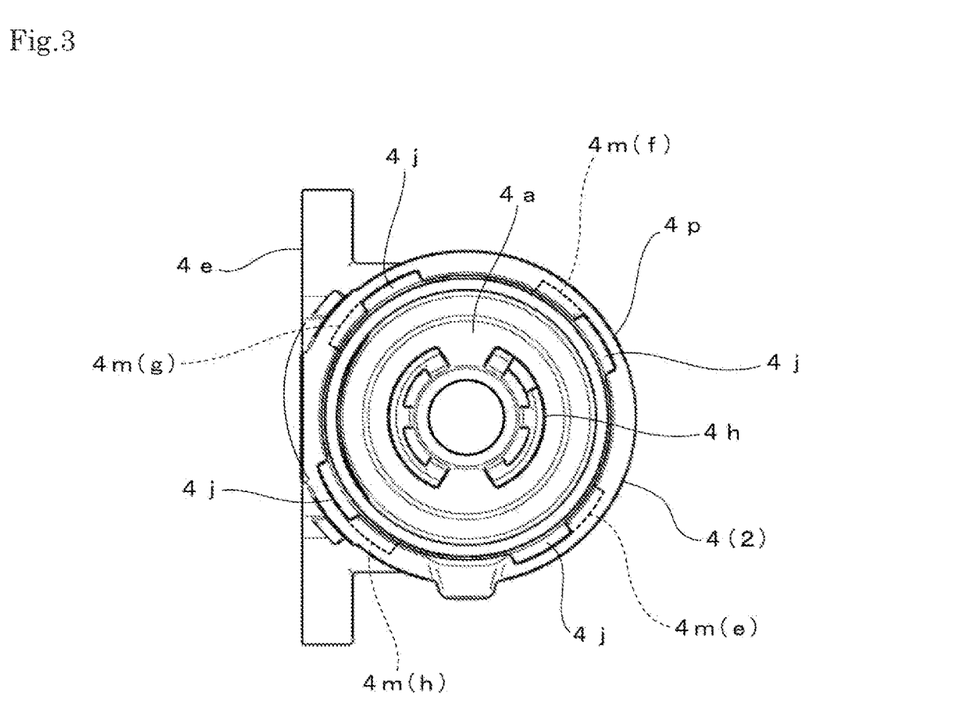
FIG. 3 is a plan view of a second housing member of the thermostat device shown in FIG. 1.
Figure 4:
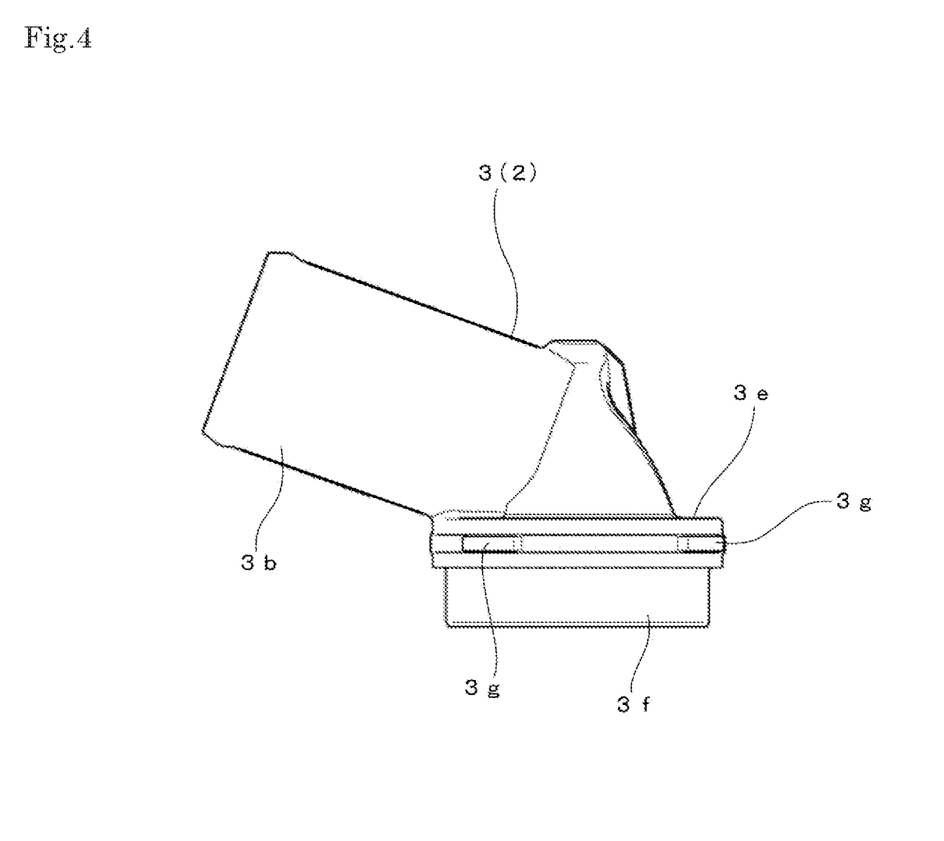
FIG. 4 is a side view of the first housing member of the thermostat device shown in FIG. 1.

FIGS. 2 to 5 show the first housing member 3 and the second housing member 4 in a disassembled state, shown primarily for a bayonet mechanism that allows both the first and second housing members 3 and 4 to be detachable. As shown in FIG. 4, the first housing member 3 has a cylindrical body 3f located at the lower end thereof and inserted into the body 40 of the second housing member 4, and an annular brim 3e projecting outward from the upper end of the cylindrical body 3f. As shown in FIG. 1, the annular valve seat 3d is formed at the inner periphery of the lower end of the cylindrical body 3f.

The second housing member 4 has an outer cylinder 40a which is located at the upper end of the body 40 and inside of which the cylindrical body 3f and the brim 3e of the first housing member are inserted. The inner diameter of the outer cylinder 40a is greater on the upper side than the lower side, and a step 40b is formed in a portion where the inner diameter changes. The inner diameter of the outer cylinder 40a on the lower side of the step 40b is the same as or slightly larger than the outer diameter of the cylindrical body 3f and smaller than the outer diameter of the brim 3e.

Therefore, in a state where the first housing member 3 and the second housing member 4 are assembled, the cylindrical body 3f is inserted to the lower side of the step 40b of the outer cylinder 40a, and the brim 3e is located above the step 40b. A seal member 6 is disposed between the step 40b and the brim 3e.

As shown in FIG. 2, in the present embodiment, four claws 3g protruding outward are formed on the outer periphery of the brim 3e of the first housing member 3 with an equal interval in the circumferential direction of the brim 3e. Namely, the claws 3g are formed at a 90-degree interval along the outer circumference of the brim 3e.

Figure 5:
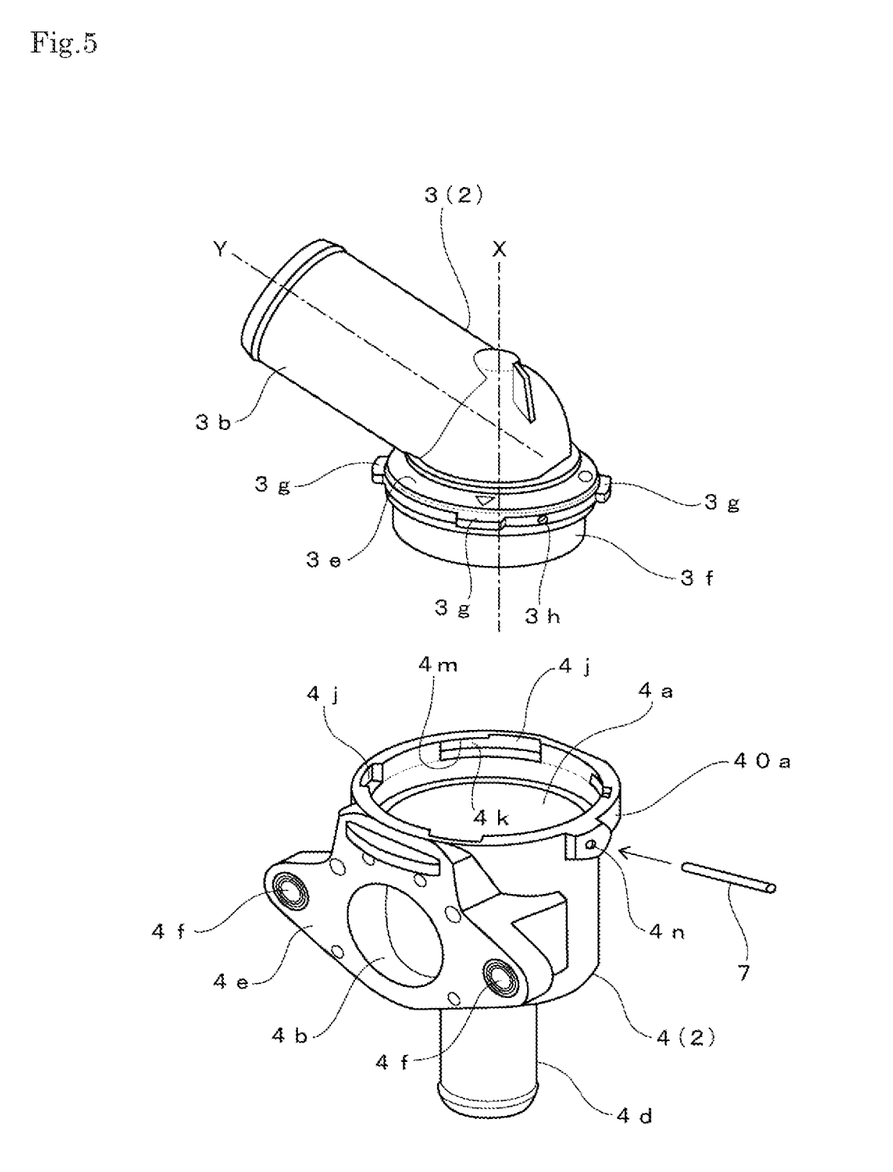
FIG. 5 is a perspective view of the first and second housing members of the thermostat device shown in FIG. 1 exploded.

Meanwhile, on the inner periphery of the outer cylinder 40a above the step 40b of the second housing member 4, as shown in FIGS. 3 and 5, four insertion grooves 4j into which the claws 3g are inserted, and four engagement grooves 4k connected thereto are formed at equal intervals in the circumferential direction of the outer cylinder 40a. That is, the insertion groove 4j and the engagement groove 4k are formed at an interval of 90° along the inner periphery of the outer cylinder 40a. As shown in FIG. 5, the insertion groove 4j extends axially downward from the upper end of the outer cylinder 40a, and the engagement groove 4k extends from the lower end of the insertion groove 4j to one side in the circumferential direction of the outer cylinder 40a.

The lateral width of the insertion groove 4j is the same as or slightly wider than the width of the claw 3g, and the vertical width of the engagement groove 4k is the same as or slightly wider than the thickness of the claw 3g. This construction allows the claw 3g to be inserted into the insertion groove 4j from the upper-end opening of the insertion groove 4j, and the claw 3g can be slid from the lower end of the insertion groove 4j to the engagement groove 4k side. The upper wall surface of the engagement groove 4k is a locking portion 4m which prevents the claw 3g inserted into the engagement groove 4k from slipping upward.

As shown in FIGS. 3 and 5, in this embodiment, since the engagement groove 4k extends in a counter-clockwise direction from the insertion groove 4j in a plan view, each claw 3g of the first housing member 3 is inserted into each insertion groove 4j of the second housing member 4, and the respective claws 3g are locked by the locking portions 4m by slightly rotating the first housing member 3 slightly counter-clockwise with respect to the second housing member 4. Thus, the claw 3g and the locking portion 4m constitute a bayonet structure, and the bayonet structure connects the first housing member 3 and the second housing member 4.

In this embodiment, the direction of rotation of the first housing member 3 with respect to the second housing member 4 during joining (at the time of fastening) is not only counter-clockwise but also clockwise.

As mentioned above, the first housing member 3 has a valve seat 3*d* formed therein, and the second housing member 4 is provided with a spring seat 4*l* that supports a spring member 5*d* that biases the control valve 5*c* toward the valve seat 3*d*.

Thereby, the first housing member 3 is biased upward with respect to the second housing member 4 via the valve body 5*c* by the spring member 5*d*, and the biasing force presses the claw 3*g* against the locking portion 4*m*. In this way, a load by the spring member 5*d* acts on the abutment surface between the claw 3*g* and the locking portion 4*m*, but the claw 3*g* and the locking portion 4*m* have a strength that can withstand the load.

The thermostat device 1 also includes a pin 7 for locking the first housing member 3 and the second housing member 4. More specifically, pin insertion holes 3*h*, 4*n* are formed in the brim 3*e* of the first housing member 3 and the outer tube portion 40*a* of the second housing member 4, respectively. The pin insertion holes 3*h*, 4*n* are arranged in the same straight line in a state where the first housing member 3 and the second housing member 4 are fastened with the bayonet structure. Therefore, by inserting the pin 7 from the pin insertion hole 4*n* of the second housing member to the pin insertion hole 3*h* of the first housing member 3, relative rotation of the first housing member 3 and the second housing member 4 is securely prevented.

As shown in FIGS. 2 and 5, the center line Y passing through the center of the radiator-side pipe 3*b* of the first housing member 3 is inclined with respect to the rotation axis X at the time of bayonet fastening between the first housing member 3 and the second housing member 4. This configuration allows changing the orientation of the radiator-side pipe by changing the locking portion 4*m* that the user engages with any of the plurality of claws 3*g*. As used herein, the engagement means stopping in engagement with each other and stopping in a state in which the claw 3*g* is hooked with respect to the locking portion 4*m*.

More specifically, in the present embodiment, the claw 3*g* and the locking portion 4*m* are provided at intervals of 90 degrees, respectively. In order to identify the four claw portions and the locking portions, let the first claw denote a, the second claw b, the third claw c, and the fourth claw d counter-clockwise from one arbitrary claw in FIG. 2, and let the first locking portion denote e, the second locking portion f, the third locking portion g, and the fourth locking portion h counter-clockwise from one arbitrary locking portion in FIG. 3. The position (orientation) of the radiator-side pipe 3*b* in a state where the first claw a, the first locking portion e, the second claw b, the second locking portion f, the third claw c and the third locking portion g, the fourth claw d, and the fourth locking portion h are engaged is defined as a reference position.

Then, when the first claw a is engaged with the second locking portion f, the second claw b with the third locking portion g, the third claw c with the fourth locking portion h, and the fourth claw d with the first locking portion e, the position of the radiator-side pipe 3*b* moves from the reference position to a position (90° rotated position) rotated by 90 degrees about the rotation axis X. Similarly, when the first claw a is engaged with the third locking portion g, the second claw b with the fourth locking portion h, the third claw c with the first locking portion e, the fourth claw d with the second locking portion f, the position of the radiator-side pipe 3*b* moves from the reference position to a position (180° rotated position) rotated by 180 degrees about the rotation axis X. Similarly, when the first claw a is engaged with the fourth locking portion h, the second claw b with the first locking portion e, the third claw c with the second locking portion f, and the fourth claw d with the third lock part g, the position of the radiator-side pipe 3*b* moves from the reference position to a position (270° rotated position) rotated by 270 degrees about the rotation axis X.

Thus, by changing the combination of the engaging claw 3*g* and the locking portion 4*m*, the direction of the radiator-side pipe 3*b* is changed by 90-degree increments using a single first housing member 4. In this case, two pin insertion holes are formed at an angle of 180 degrees on one of the brims 3*e* in which the claw 3*g* is formed and the outer cylinder 40*a* in which the locking portion 4*m* is formed, and two pin insertion holes are formed at an angle of 90 degrees to the other. Thus, even when the radiator-side pipe 3*b* is at any of the reference positions, the 90° rotated position, the 180° rotated position, and the 270° rotated position, it is possible to stop the rotation by the pin 7.

As shown in FIG. 2, different positioning marks 3*i* and 3*j* are provided on the upper surface of the brim 3*e* of the first housing member 3 at positions corresponding to the first and second claws a and b, respectively, forming a position indicator M. While a location symbol 4*p* (FIG. 3) is made to the outer periphery of the outer cylinder 40*a* of the second housing member 4 at a position corresponding to the insertion groove 4*j* for guiding the claw 3*g* to the second locking portion f.

Thus, when the first housing member 3 and the second housing member 4 are fastened together with the mark 3*j* corresponding to the second claw b to the location symbol 4*p*, the radiator-side pipe 3*b* is arranged at the reference position, and the radiator-side pipe 3*b* is arranged at the 90-degree rotated position by fastening the first housing member 3 and the second housing member 4 together with the positioning mark 3*i* corresponding to the first claw a to the location symbol 4*p*.

Thus, the direction of the radiator-side pipe 3*b* can be set to the reference position or the 90-degree rotated position by bayonet coupling by aligning the positioning mark 3*j* indicated by a circle mark on the first housing member 3 side or the positioning mark 3*i* indicated by a triangle mark to the location symbol 4*p* on the second housing member 4 side.

As explained above, the thermostat device 1 according to the present embodiment includes:
  a housing 2 disposed in the middle of a circulation flow path for circulating a coolant between an engine and a radiator and having a housing chamber 4*a* formed therein and having a first conduit 3*a* and a second conduit 4*b* for recirculating the coolant into the housing chamber 4*a*;
  a valve seat 3*d* formed on an inner peripheral wall between the housing chamber 4*a* of the housing 2 and the first conduit 3*a*; and
  a thermoelement 5*a* housed in the housing chamber 4*a* and axially moving depending on the temperature of the coolant; a control valve 5*c* which separates and seats on the valve seat 3*d* as the thermo-element 5*a* moves in the axial direction, and
  a spring member 5*d* which biases the control valve 5*c* toward the valve seat 3*d*.

The housing 2 includes a first housing member 3 having a radiator-side pipe 3*b* having a first conduit 3*a* formed therein and a valve seat 3 *d* formed therein, and a second housing member 4 rotation-fastened to the first housing member 3 by a bayonet structure to form a second conduit 4*b*. The bayonet structure includes, in the first housing member 3, a plurality of claws 3*g* formed side by side in the circumferential direction and a plurality of locking portions 4m formed in the second housing member 4 to be engaged with the claws 3g. The radiator-side pipe 3b is inclined with respect to the rotation axis X when viewed from one side of the rotation axis X when the first housing member 3 and the second housing member 4 are fastened.

According to the above configuration, the orientation of the radiator-side pipe 3b can be changed by changing the locking portion 4m that engages any one of the plurality of claws 3g. That is, when changing the orientation of the radiator-side pipe 3b, it is only necessary to change the combination of the engaging claw 3g and the locking portion 4m, and it is not necessary to remake the first housing member having the radiator-side pipe 11a changed in the direction from the mold as in the prior art, and the cost can be suppressed.

Further, the configuration utilizes a bayonet structure to fasten the first housing member 3 and the second housing member 4. Thus, since the first housing member 3 and the second housing member 4 can be fastened by some relative rotation, for example, compared to the case where the first housing member 3 and the second housing member 4 are fastened by such as bolts, welding, the number of parts is reduced, and a large-scale device is not required, whereby it can be easily and inexpensively fastened.

In the thermostat device 1 of this embodiment, a position indicator M is formed in the first housing member 3 on the outer peripheral surface of the housing 2, and a location symbol 4p pointing to the position indicator M is formed in the second housing member 4. The position indicator M is formed to correspond to the claw 3g, and the location symbol 4p indicates which locking portion of the plurality of locking portions 4m is engaged with any one of the plurality of claws 3g.

According to the above configuration, the location symbol 4p may be adjusted to the position indicator M according to the orientation of the radiator-side pipe 3b to be set, and the direction of the radiator-side pipe 3b can be easily set.

In this embodiment, the position indicator M is formed by the positioning marks 3j of the circles and the positioning marks 3i of the triangle marks. As a result, the first housing member 3 is made of resin, and it is easy to form a position indicator M when injection molding is performed, but the marks constituting the position indicator M can be appropriately changed. For example, the position indicator M may be a numeral figure, a sign composed of a single line or two lines, or a sign composed of a vertical line and a horizontal line.

Further, in this embodiment, while the number of the claw 3g is four, the number of the positioning mark of the corresponding position indicator M is two, and the orientation of the radiator-side pipe 3b is set to either the reference position or the 90-degree rotational position by aligning the location symbol 4p with one of the position indicators. However, the marks corresponding to each of the four claws 3g may be formed as position indicator M. In addition, the number of the claws 3g and that of the locking portion 4m may be more or less than four. The position indicator M may be provided on the side of the locking portion 4m, and the location symbol 4p may be provided on the claw 3g side, even if the locking portion 4m is formed on the first housing member 3 and the claws 3g are formed in the second housing member 4.

In addition, the thermostat device 1 according to the present embodiment comprises a pin 7 passing through the first housing member 3 and the second housing member 4 in a state where the first housing member 3 and the second housing member 4 are rotation-fastened by a bayonet structure. This can prevent relative rotation of the first housing member 3 and the second housing member 4 by the pin member 7, thereby reliably preventing the fastening of the first housing member 3 and the second housing member 4 from being unintentionally released. The detent structure preventing the relative rotation of the first housing member 3 and the second housing member 4 is not limited to the pin 7 and can be suitably changed.

The second housing member 4 of the thermostat device 1 of this embodiment has a spring seat 4l supporting one end of the spring member 5d. As mentioned above, the spring member 5d biases the control valve 5c toward the valve seat 3d formed in the first housing member 3. This presses the claw 3g against the locking portion 4m by the spring member 5d with the control valve 5c seated on the valve seat 3d. This prevents the first housing member 3 and the second housing member 4 from being easily relatively rotated and disassembled without providing a detent structure such as the pin 7.

In addition, according to the present embodiment, the thermostat device 1 comprises a seal member 6 for sealing between the first housing member 3 and the second housing member 4. The claw 3g is disposed outside of the seal member 6. According to this configuration, the claw 3g and the locking portion 4m are not immersed in the coolant and are advantageous in durability when formed of a synthetic resin.

It should be noted that the thermostat device 1 according to the present embodiment is an inlet control type disposed on the inlet side of the coolant of the engine, but it may be an outlet control type disposed on the outlet side of the coolant of the engine, and in this case, a similar effect can be obtained.

Also, the housing 2 of the present embodiment is made of a synthetic resin, and the housing 2 can be made lightweight, inexpensive, and easily formed by injection molding, for example. However, the molding method and the material of the housing 2 can be suitably changed.

While preferred embodiments of the invention have been described in detail, modifications, variations, and variations are possible without departing from the scope of the claims.

REFERENCE SIGN LIST

1 Thermostat device
2 housing
3 first housing member
3a first conduit
3b radiator-side pipe
3d valve seat
3e brim
3g claw
3h pin insertion hole
3i, 3j positioning mark
4 second housing member
4a housing chamber
4b second conduit
4c third conduit
4d bypass-side pipe
4h guide member
4j insertion groove
4k engagement groove
4l spring seat
4m locking portion
4n pin insertion hole
4p location symbol
thermo-operating unit 5a thermo-element
5b piston
5c control valve (valve body)
5d spring member
6 seal member
7 pin member
M position indicator

What is claimed is:

1. A thermostat device, comprising:
a housing disposed in the middle of a circulation flow path for circulating coolant between an engine and a radiator, having a housing chamber therein and a first conduit and a second conduit for recirculating the coolant into the housing chamber;
a valve seat formed on the inner circumferential wall between the housing chamber of the housing and the first conduit;
a thermo-element housed in the housing chamber, moving in the axial direction depending on the temperature of the coolant;
a control valve seating on or unseating from the valve seat in accordance with the axial movement of the thermo-element; and
a spring member which biases the control valve toward the valve seat, wherein
the housing is provided with a first housing member having a radiator-side pipe forming a first conduit and having the valve seat and a second housing member which is rotation-fastened to the first housing member with a bayonet structure, forming a second conduit,
the bayonet structure includes a plurality of claws formed arrayed on the circumferential direction on either one of the first or second housing members and a plurality of locking portions to which the claws are locked on either one of the other housing members, and
the radiator-side pipe is inclined with respect to the rotation axis when viewed from one side of a rotation axis when fastening the first housing member and the second housing member.

2. The thermostat device recited in claim 1,
wherein
on the outer surface of the housing, a position indicator is placed on any one of the first and second housing members, and positioning marks pointing to the position indicator formed on the other, and
the positioning indicator is made to coincide with any one of the claws or locking portions, and
the positioning mark indicates which of the plurality of claws engages with the corresponding one of the plurality of locking portions.

3. The thermostat device recited in claim 1,
wherein
a pin member is provided, penetrating the first housing member and second housing member in a state where the first and second housing members are rotated and fastened with the bayonet structure.

4. The thermostat device recited in claim 1,
wherein
the second housing member is provided with a spring seat that supports one end of the spring member.

5. The thermostat device recited in claim 1,
wherein
the thermostat device comprises a seal member for sealing between the first housing member and the second housing member, the claw being disposed further outward than the seal member.

* * * * *